(12) United States Patent
Slavin

(10) Patent No.: US 6,795,587 B2
(45) Date of Patent: Sep. 21, 2004

(54) IMAGE RESIZING USING SHORT ASYMMETRIC FIR FILTERS

(75) Inventor: Keith R. Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 598 days.

(21) Appl. No.: 09/911,633

(22) Filed: Jul. 23, 2001

(65) Prior Publication Data

US 2003/0021475 A1 Jan. 30, 2003

(51) Int. Cl.[7] .................................................. G06K 9/40
(52) U.S. Cl. ....................................... 382/260; 382/298
(58) Field of Search ............................... 382/260, 256, 382/254, 266, 298, 299, 300, 251; 348/384.1, 392.1, 405.1; 341/143, 118

(56) References Cited

U.S. PATENT DOCUMENTS

| | | | | |
|---|---|---|---|---|
| 5,892,632 A | * | 4/1999 | Behrens et al. | 360/51 |
| 6,313,772 B1 | * | 11/2001 | McNeely | 341/143 |
| 6,317,167 B1 | * | 11/2001 | McNeely | 348/724 |
| 6,351,740 B1 | * | 2/2002 | Rabinowitz | 706/22 |
| 6,408,109 B1 | * | 6/2002 | Silver et al. | 382/300 |

* cited by examiner

*Primary Examiner*—Yon J. Couso
(74) *Attorney, Agent, or Firm*—Fish & Neave; Garry J. Tuma; Evelyn C. Mak

(57) ABSTRACT

Asymmetric finite impulse response (FIR) filters are used to estimate gradients for re-sampling models used in image resizing. Better than conventional 3-tap symmetric FIR filters, these filters provide good edge and extended-frequency responses with good narrow peak sharpening characteristics. These filters emphasize accurate edge handling, where gradients are steepest, over accurate peak handling, where gradients are shallowest. This results in superior zone-plate test signals and better resized image quality.

32 Claims, 7 Drawing Sheets

IMAGE RESIZING USING SHORT ASYMMETRIC FIR FILTERS

BACKGROUND OF THE INVENTION

This invention relates to image resizing. More particularly, this invention relates to finite impulse response (FIR) filters that provide good image resizing results with reduced processing.

An image is a stored description of a graphic picture (e.g., video, text, etc.) and is often described as a set of pixels having brightness and color values. A pixel (i.e., a picture element) is generally one spot in a grid of spots that form the image.

Image resizing changes the size of an image by altering the number of pixels in the representation. For example, to reduce the size of an image, fewer pixels are used. To enlarge the size of an image, more pixels are used. Image resizing may also include altering pixel brightness and color values. Resizing a digital representation of an image may be accomplished using a digital filter to change the sampling density of the image. Resizing and "re-sampling" can thus be considered the same process.

A signal can be more efficiently re-sampled in the digital domain rather than in the analog domain, which involves converting the digital representation of an image into the analog domain, filtering, and then converting back to the digital domain. An input sampling grid can be used to describe the positions of all samples or pixels. It is commonly assumed that {0,0} are the {x,y} coordinates of the top left pixel of an image. An increase in an x-axis value can indicate a move to the right in the image, while an increase in a y-axis value can indicate a move down the image. Other suitable interpretations are also valid. Historically, the order described follows the standard scan order of a television screen, computer monitor, or other suitable display. A particular output pixel can be generated at a certain position in the input grid. For example, position {5.37,11.04} means $37/100$ of the distance from column 5 (left) to column 6 (right) in the x-axis, and $4/100$ of the distance from row 11 (above) to row 12 (below) in the y-axis. The position is said to have an input pixel index part (i.e., an integer index less than or equal to 5.37 (e.g., 5)), and a fractional part (e.g., $37/100$) corresponding to the fraction of the distance from the integer to the next pixel index along an axis.

Re-sampling systems can often be simplified by performing axis-separable processing. In other words, re-sampling can occur along each axis independently of the other. If high quality re-sampling occurs along each axis, then the overall re-sampling quality after combining processing from both axes should also be of high quality. In hardware, each re-sampling implementation can be based on processing pipelines, so a separate re-sampling system can be used for each axis for better performance. In memory-to-memory systems, the image can be split into tiles. Each tile can be processed with a separate re-sampler, with source and destination image memory bandwidth limiting processing speed. In software, one subroutine may be able to serve both axes.

Re-sampling of text and graphics images has different requirements than for video images. In the former cases, sharp edges and the absence of ringing artifacts on transitions are important.

In contrast, for some images, the preservation of spectral content in some regions is important. For other regions, behavior closer to that of graphics and text is ideal. For example, an image may consist of single sine-wave components at each position with uniform and smooth frequency changes as a function of position (such as found in typical "zone-plate" test patterns). Spectral preservation only works when re-sampling such images. In contrast, transitions between objects are not spectral in nature, and a text-like interpretation may be more appropriate.

Two basic approaches to re-sampling are possible. One approach uses different filters to calculate output pixels based on their position with respect to the input pixels. These so-called "poly-phase" re-samplers require large filter coefficient storage, as well as many multipliers and other logic devices.

Another approach is to construct piece-wise continuous models of the waveform between each integer input sample position. Any number of output samples can be generated at any fractional position between them. This approach is generally more economical and can also be used with text and graphics inputs.

For up-sampling (i.e., image enlargement) in general, better results are obtained if each continuous model generates output sample values that go through the input samples (at their integer positions). In the piece-wise model case, the output models, when placed end-to-end and viewed as a continuous waveform, go through all the input sample points.

Cubic polynomial piece-wise models can be obtained by constraining the waveform to go through two input samples as long as the components of the gradients along the axis being processed at these two samples are also known. A gradient can be defined as an estimate of the rate of change, or slope, between two sample values. The gradients can be estimated using a finite impulse response (FIR) differentiating filter, which takes a set of weighted sums of a set of input samples to generate an output (gradient) sample. The number of samples used is referred to as its history, or number of taps. The number of taps and the relative weight of each tap determine the filter response. The set of input samples used to create each model have a fixed position relative to that model.

Along each axis, a re-sampling system can be designed to step through the input sample grid, calculating where each output sample lies, and then calculate the integer index and fractional values. The sampling system can then obtain the set of input samples to use and apply them to FIR filters to generate the two co-sited gradients at the two neighboring positions (i.e., index and index+1). The system may then calculate the cubic model and evaluate the model at the fractional position to obtain the output pixel value.

As is well known in the art, better spectral re-sampling is possible when more input points are used to create each output sample. The resulting longer FIR filters, however, require more computation, which can restrict throughput (output pixels per second generated) or increase costs.

At least four samples are needed for spectral separation. The cubic model is obtained from the gradients of the sample signal (e.g., g(0) and g(1)) co-sited respectively with the middle two of the four input samples (e.g., f(−1), f(0), f(1), f(2)). The gradients are calculated from the weighted sum of neighboring input samples. Co-sited refers to two corresponding values that have the same index or are at the same position. For example, f(0) can be co-sited with g(0) (gradient g(0) is calculated using f(0) and its neighboring input samples) and similarly, f(1) can be co-sited with g(1)). The four known values (e.g., f(0), g(0), f(1), g(1)) are then used to obtain the cubic coefficients. The two middle input samples will surround the generated output sample, and the gradients each correspond to one of the two corresponding middle input samples. From the estimated gradients, a model is created which is then used to calculate the output values of the resized image at a fractional position.

In view of the foregoing, it would be desirable to provide an improved cubic piece-wise continuous model approach with economical re-sampling of spectral image content.

It would also be desirable to provide a FIR filter requiring only four input samples for spectral separation having a good differentiating frequency response.

It would further be desirable to provide a FIR filter having good edge and narrow peak handling characteristics that provides good resized image qualities.

SUMMARY OF THE INVENTION

It is an object of this invention to provide an improved cubic piece-wise continuous model approach with economical re-sampling of spectral image content.

It is another object of the invention to provide a FIR filter requiring only four input samples for spectral separation having a good differentiating frequency response.

It is a further object of the invention to provide a FIR filter having good edge and narrow peak handling characteristics that provides good resized image qualities.

In accordance with this invention, an image resizer is presented that includes several processing stages. Image resizing involves a linear process (e.g., re-sampling and filtering are both linear) in which signals or samples add linearly. Stage one is gamma modification, which involves removing video gamma correction that was previously applied to an image and reapplying a new gamma. Gamma is a measure of contrast in an image. Different gamma values display different intensity pixels on a screen. In a gamma-corrected linear luminance domain (Y'), black narrow features are linear (or additive) on a white background for a gamma $\gamma$ equal to about 2.5. In a linear luminance domain (Y), white narrow features are linear (or additive) on a black background for a gamma $\gamma$ equal to about 1. The two domains Y and Y' are related by $Y=(Y')^\gamma$ or $Y'=(y)^{1/\gamma}$. Although an image may already have gamma correction (Y') applied to it, decimating such an image may create undesirable effects on extreme narrow bright impulses. Impulses can be described as a jump or spike with respect to neighboring input samples where the width of the spike is extremely narrow. On the other hand, removing the gamma (to work in the Y domain) may create undesirable effects on extreme narrow dark impulses. As a compromise, a $\gamma$ of about 1.6 is preferably applied to the signal prior to resizing (e.g., $Y_{1.6}=(Y')^{\gamma/1.6}$) because it averages the undesirable effects of the narrow white and narrow dark features of the luminance domains.

Stage two involves filtering the middle two input samples of four gamma-modified input signal samples. Decimation filtering is applied to the four input samples using preferably a $\{\frac{1}{4}, \frac{1}{2}, \frac{1}{4}\}$ symmetric 3-tap FIR filter. Because each output value requires three input samples and there are four input samples, only the two middle samples are filtered. Decimation by factors greater than two can be accomplished by multiple passes of decimation-by-two with a final pass of decimation by close to two. Because a final pass may use a decimation factor between one and two, a number of selectable filter banks that range from decimation-by-one to decimation-by-two are provided in memory. If the desired filter bank is not available, the final decimation pass uses the closest available decimation filter. However, this may result in noticeable filter switching during dynamic zooming. Generally, having more selectable filter banks results in less noticeable filter switching.

Stage three involves finding the co-sited gradients. Gradients are calculated using the input samples, so stage two and stage three can be executed in parallel. The gradients are calculated using digital differentiating filters. For image reduction (i.e., down-sampling), a simple pair of differentiating filters is used for gradient estimation. For image enlargement (i.e., up-sampling), an asymmetric FIR differentiating filter is advantageously used for gradient estimation in accordance with the present invention. This filter results in better image resizing than conventional 3-tap symmetric filters often used for gradient estimation. The asymmetric FIR filter emphasizes accurate edge handling over accurate peak handling, resulting in improved zone-plate test signals and a sharper image appearance in general. Zone plates are video test signals in which the spatial frequencies are a smooth function of $\{x,y\}$ position.

Stage four involves calculating the cubic polynomial coefficients using the two middle input samples from stage two and the two co-sited gradients calculated in stage three.

Stage five involves calculating the re-sampled output sample value. A piece-wise cubic model is preferably generated to obtain a piece-wise continuous model of the output signal. The model is then evaluated at the desired fractional position to obtain a re-sampled value.

Stage six involves gamma modification to reapply gamma correction. The compromise gamma correction applied in stage one is removed and the initial gamma correction is reapplied to produce the resulting resized image. The initial gamma needs to be re-applied in order to display the resulting image correctly on a non-linear device, such as a monitor. Reapplying the original gamma correction to the resized image means that the system does not change the presentation of flat regions in an image (static component), but affects the position of edges (dynamic component) so that narrow bright and dark regions are both preserved from the gamma correction applied in stage one.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides high quality image resizing using short asymmetric FIR filters to estimate gradients.

Gradients are used to create re-sampling models used in the image resizing process.

Figure 1:
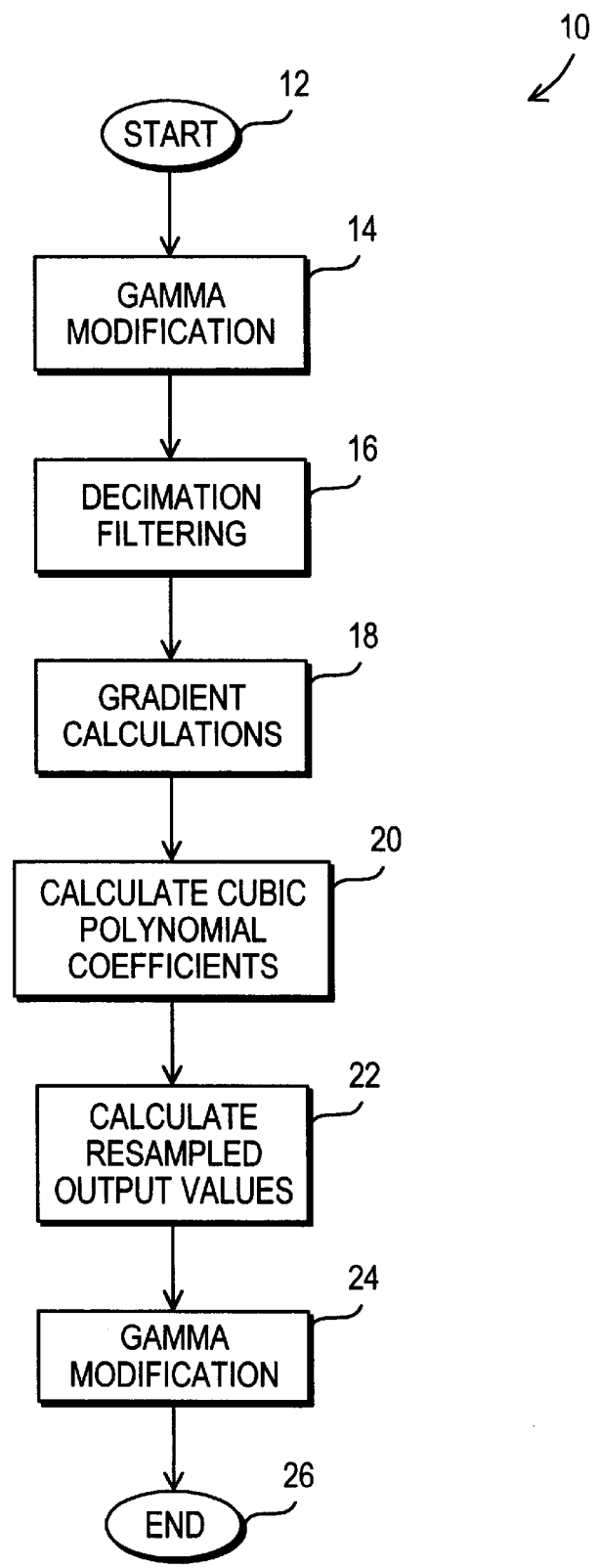
FIG. 1 is a flow chart of an exemplary embodiment of a resizer algorithm according to the present invention.

FIG. 1 illustrates a compact image resizer algorithm 10 in accordance with the present invention. Algorithm 10 begins at step 12 with an image. At step 14, gamma modification occurs. Gamma modification includes removing any existing video gamma correction and applying a new selectable gamma.

A goal of re-sampling and filtering is to preserve the luminance of an image when decimating. Since re-sampling and filtering are both linear, they impose linearity on the re-sampled transitions after each decimation pass. The final gamma re-correction then changes the nature of these edges in the desired manner. Two domains need to be considered: the gamma-corrected linear luminance (or Y') domain and the linear luminance (or Y) domain. Linear luminance, or linear intensity, is related to the human perception of additive light on a dark background (e.g., the human eye is unable to distinguish between two white spots that are close together with similar resolutions against a black background; the eye discerns the two white spots as one white spot with the same brightness). The Y' domain gives good linearity for fine black detail since blackness is additive in the Y' domain (e.g., two black spots that are close together with similar resolutions against a white background are discerned as one equally black spot).

A gamma of about 1.6 is a recommended compromise for the optimal handling of both narrow light and narrow dark features. Powers of $1/1.6$, 1.6, and 2.5 are preferred precalculated table values for gamma removal or reinsertion, and the corresponding reciprocal powers are preferred for gamma re-application. Because the gamma of the input signal may differ from the gamma that produces optimal results, the input signal gamma is replaced with a preferred processing gamma.

After gamma modification, decimation filtering occurs at step 16. At this stage, a {¼, ½, ¼} symmetric 3-tap FIR filter is preferably used to filter the image.

The filter tap symmetry and its asymmetric response around an angular frequency of π/2 produce reasonably good results when decimating by two. Furthermore, the 3-tap coefficients {¼, ½, ¼} are economical to implement in hardware and software since the coefficients are powers of two.

A {¼, ½, ¼} symmetric 3-tap filter can be applied to a four-input sample window, generating two output samples co-sited with the middle two input samples. Each of the output samples relates to a corresponding inner input sample. With only four input samples, additional output samples cannot be used in later calculations without introducing undesirable artifacts. Decimation by factors greater than two consists of one or more passes of decimation-by-two, followed by a final pass of decimation by less than two. Decimating by more than two in one pass may result in undesirable features such as narrow pass-bands, steep transition bands, or inadequate filter performance because of the few taps. In a final decimation pass, varying response curves may result, causing noticeable filter switching while dynamically changing resizing ratios (i.e., dynamic resizing). To prevent filter switching from becoming too noticeable, multiple pre-specified filter banks are preferably available to select from for the final decimation pass. To obtain substantially imperceptible switching over the final decimation, nine different filters are preferably provided (i.e., decimation-by-two, decimation-by-one, and seven intermediate blends). This represents a compromise between noticeable filter switching and the amount of hardware needed to store banks of pre-specified filters. The unblended decimation-by-two anti-aliasing filter has the following response:

$$A[\omega]=(1+\cos(\omega))/2 \qquad (1)$$

where ω is the angular frequency and A[ω] is the frequency response.

Figure 2:
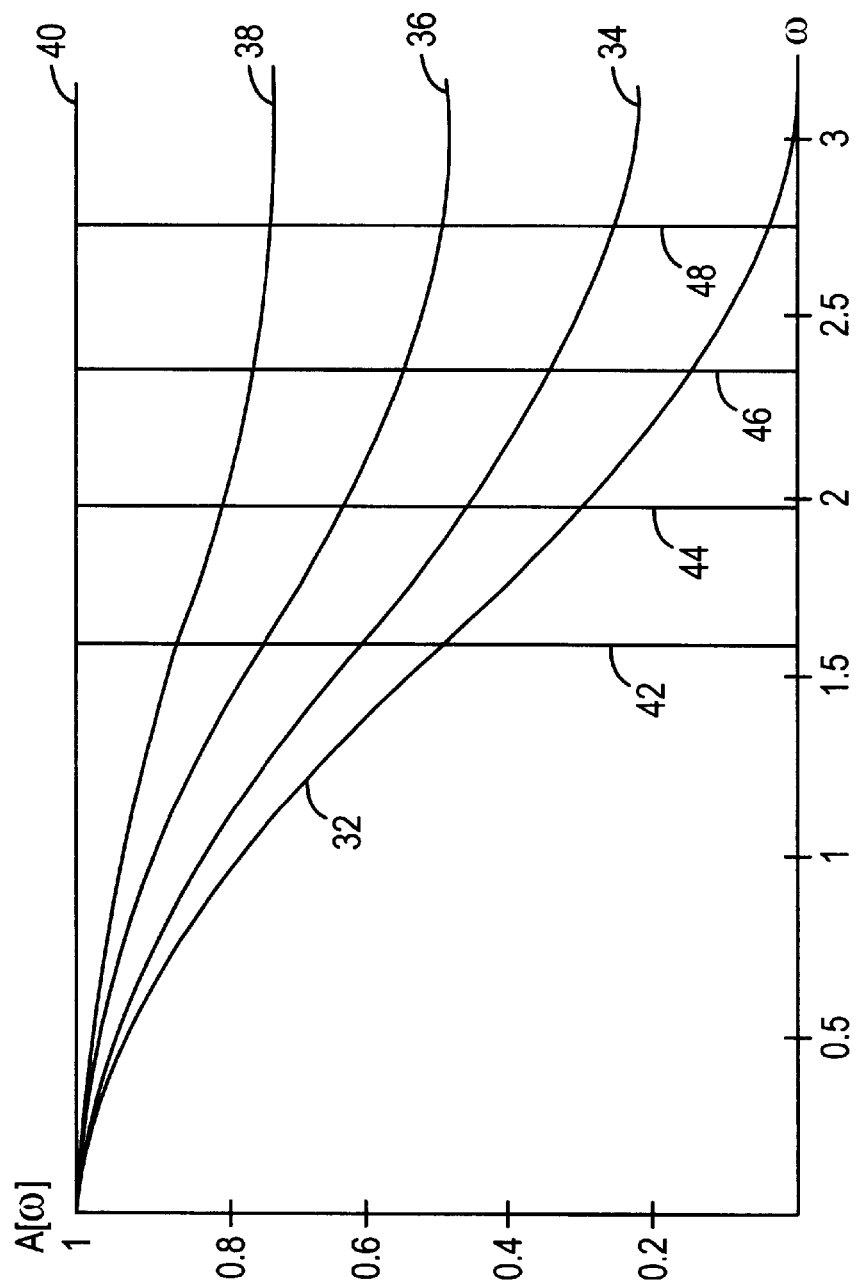
FIG. 2 is an illustration of blended anti-alias filter response curves according to the present invention.

FIG. 2 illustrates {¼, ½, ¼} filter response curves blended with the {0, 1, 0} all pass filter anti-alias filter response curves from decimation-by-two to decimation-by-one (i.e., no decimation), with corresponding ideal anti-alias cutoffs. The x-axis represents the angular frequency and the y-axis represents the frequency response. Curve 32 shows an unblended decimation-by-two filter response. Curves 34, 36, and 38 are three intermediate blended curves with decimation factors between one and two. Curve 34 has a decimation factor less than two and has a larger decimation factor than curve 36, which has a larger decimation factor than curve 38. Horizontal line 40 represents the all-pass case for no decimation. Also shown are corresponding ideal, but unrealizable, anti-alias responses with vertical cutoff transitions. Moving from left to right in FIG. 2, cutoff transition 42 corresponds to the decimation-by-two response. Intermediate cutoff transitions 44, 46, and 48 correspond to the intermediate blends. For the all-pass case, there is no cutoff frequency. When the angular frequency is π, the cutoff no longer exists. The selection of filter blending on each resizer pass may be implemented using software.

Blending the {¼, ½, ¼} with the {0, 1, 0} filter is a reasonable compromise between cost and image quality. Compared to the ideal responses, the filter blending curves may introduce some blurring and aliasing artifacts for decimation ratios between one and two. Since blending mainly occurs in the final decimation pass, its impact on the resulting image can be reduced. Other decimation filters may produce better spectral results, but with more hardware.

Step 18 of algorithm 10 involves gradient calculations. To generate accurate piece-wise cubic models, gradients co-sited with the original sample values are needed. The 3-tap filter used for decimation processing outputs two samples, which are insufficient to obtain reliably accurate gradients at high frequencies. As a result, gradients are calculated directly from the input data. Since the gradient calculations are not dependent on any output data from decimation filtering, the gradient calculations at step 18 may be performed simultaneously with the decimation filtering at step 16.

Figure 3:
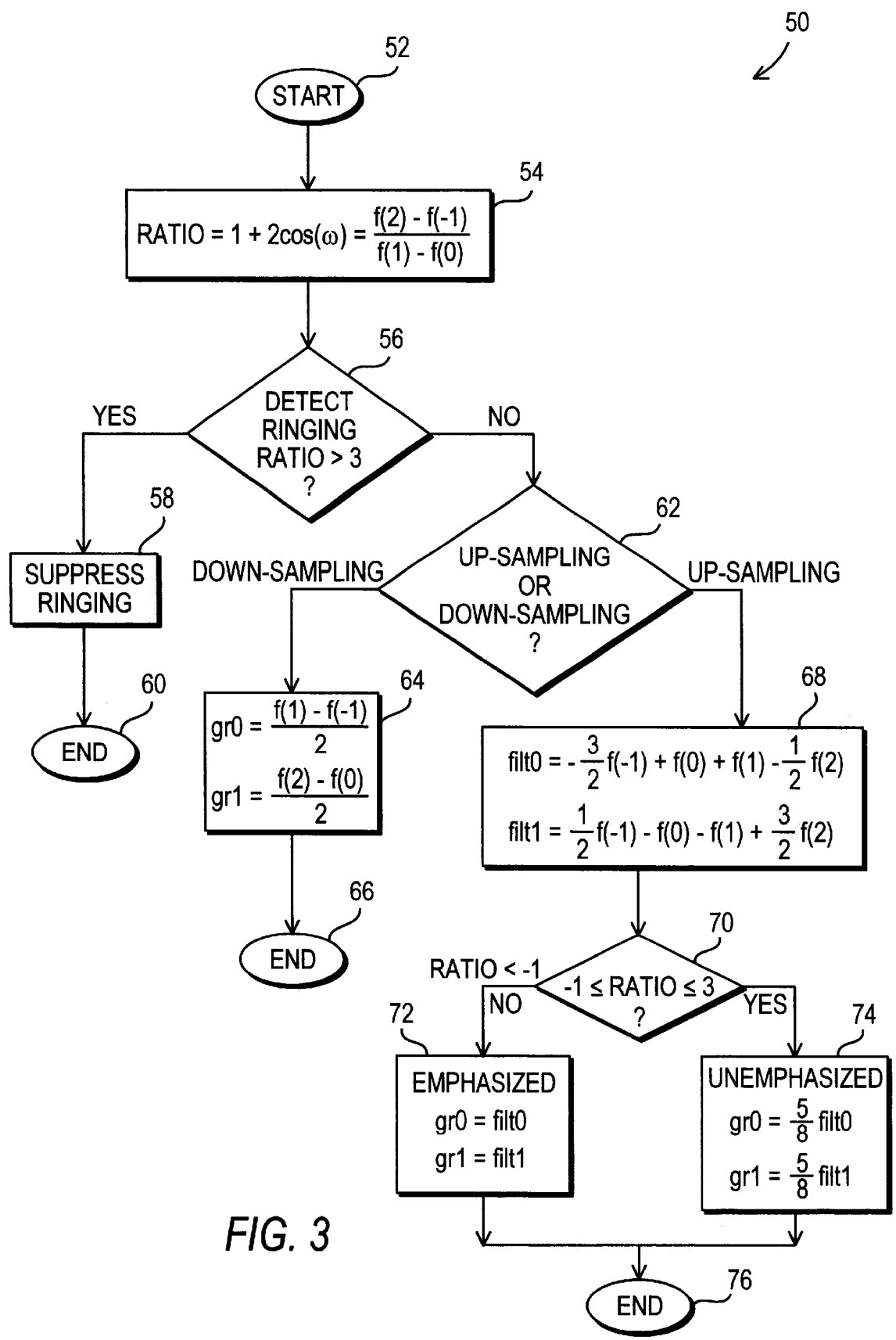
FIG. 3 is a flow chart of an exemplary embodiment of the gradient calculations of FIG. 1 according to the present invention.

FIG. 3 illustrates an exemplary embodiment of gradient calculations performed at step 18. Process 50 begins at step 52 with four input samples, which are all that are needed to represent a single sine wave of angular frequency A. At step 54, the signal can be represented as follows:

$$\text{ratio}=1+2\cos(\omega)=(f_2-f_{-1})/(f_1-f_0), \qquad (2)$$

where $f_{-1}$, $f_0$, $f_1$, and $f_2$ represent the four available input samples. Ringing may be detected at step 56 by examining the ratio in equation (2). Since the range of cos(ω) is limited to values between −1 and +1, the ratio ideally ranges from −1 to +3. A ratio that exceeds +3 may be caused by adjacent sharp edges that can cause visible ringing if applied to the filters. If ringing is detected at step 56, the ringing is preferably suppressed at step 58 and process 50 then ends at step 60 for those samples.

If no ringing is detected, process 50 moves to step 62 to determine whether down-sampling (i.e., reducing the image size) or up-sampling (i.e., enlarging the image size) is performed. For down-sampling, a pair of differentiating filters are used at step 64 for gradient estimation to enhance edges. Two gradients are calculated as follows:

$$gr0=(f_1-f_{-1})/2$$

$$gr1=(f_2-f_0)/2 \quad (3)$$

The frequency response of the superposition of these linear systems is $G[\omega]=\sin(\omega)$, which roughly matches the ideal differentiator convolved with the filter response of the anti-aliasing filter from equation (1). The ideal differentiating response is represented by:

$$D[\omega]=[\omega(1+\cos(\omega))]/2 \quad (4)$$

Figure 4:
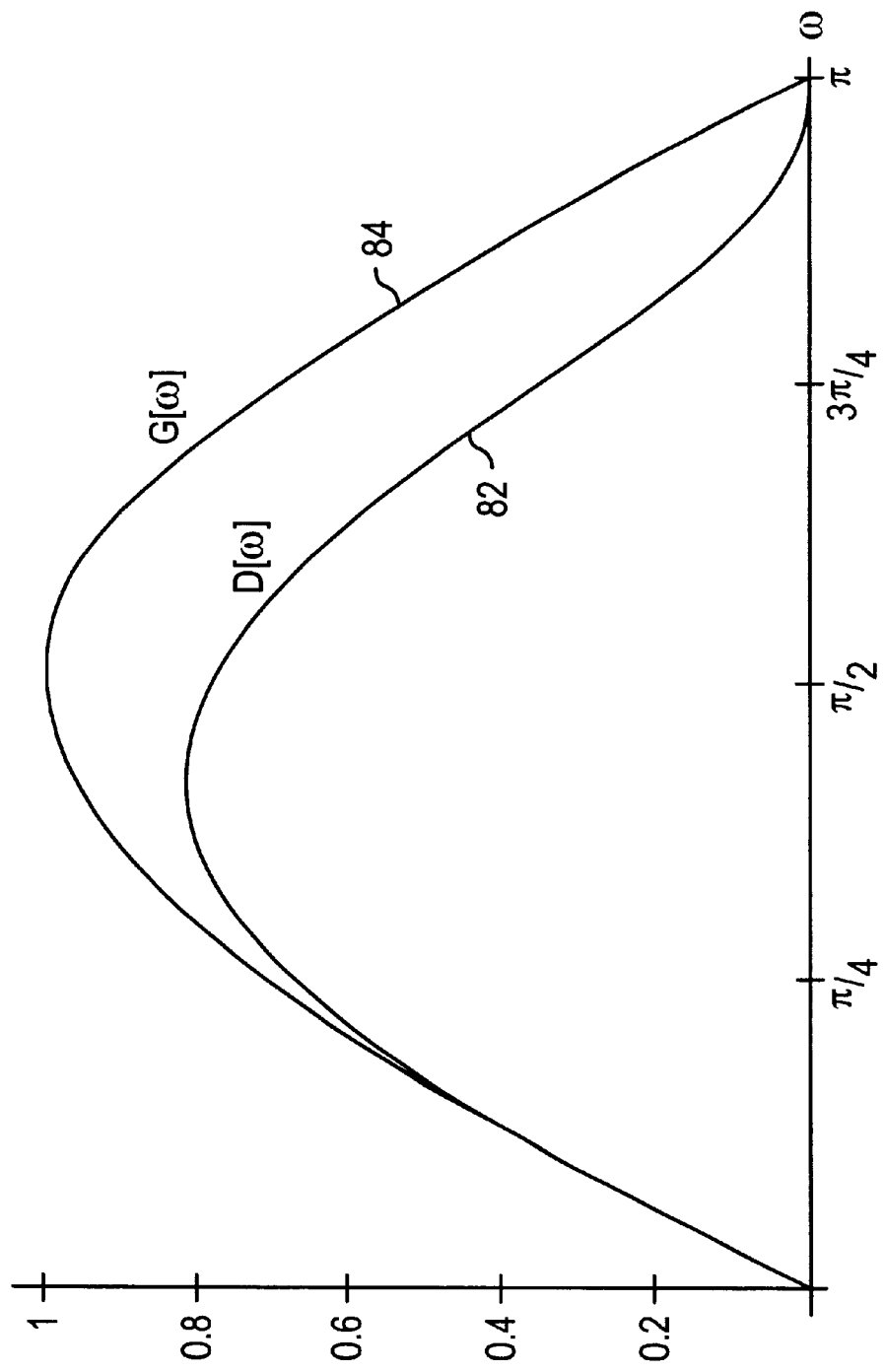
FIG. 4 is an illustration of differentiating filter response curves according to the present invention.

FIG. 4 illustrates a pair of differentiating filter response curves. Curve 82 shows the ideal differentiating response represented by equation (4). Curve 84 shows the actual differentiating filter response used for gradient estimation. The actual response is close to the ideal response for angular frequencies below $\pi/4$. At higher angular frequencies, the discrepancy in the two curves results in some artifacts. Because the filters do not cut off all frequencies above $\pi/2$, aliasing may still occur although it is advantageously significantly reduced.

When down-sampling, prior artificial model sharpening may increase aliasing problems. Because sharpening occurs naturally from down-sampling, providing external sharpening is unnecessary. Gradient calculations for down-sampling end at step 66.

To up-sample an image, process 50 moves to step 68. Up-sampling attempts to sharpen images without affecting zone-plate frequency response and transition quality. For cases where the angular frequency is between zero and $\pi$, a single sine wave may be fitted to the four sample points to interpolate between the middle two points. However, this approach is expensive. A less costly alternative is to use asymmetric FIR differentiating filters in accordance with the present invention. Two such filters preferably used are as follows:

$$filt0=-(3/2)f_{-1}+f_0+f_1-(1/2)f_2$$

$$filt1=(1/2)f_{-1}-f_0-f_1+(3/2)f_2 \quad (5)$$

These filters represent a compromise between their anti-symmetric response and their symmetric response. An anti-symmetric response has good edge accuracy while a symmetric response has good peak accuracy. Because the human eye is more sensitive to edge accuracy than peak accuracy, the filters are designed to produce better anti-symmetric edge response while sacrificing some of the symmetric peak response.

Figure 5:
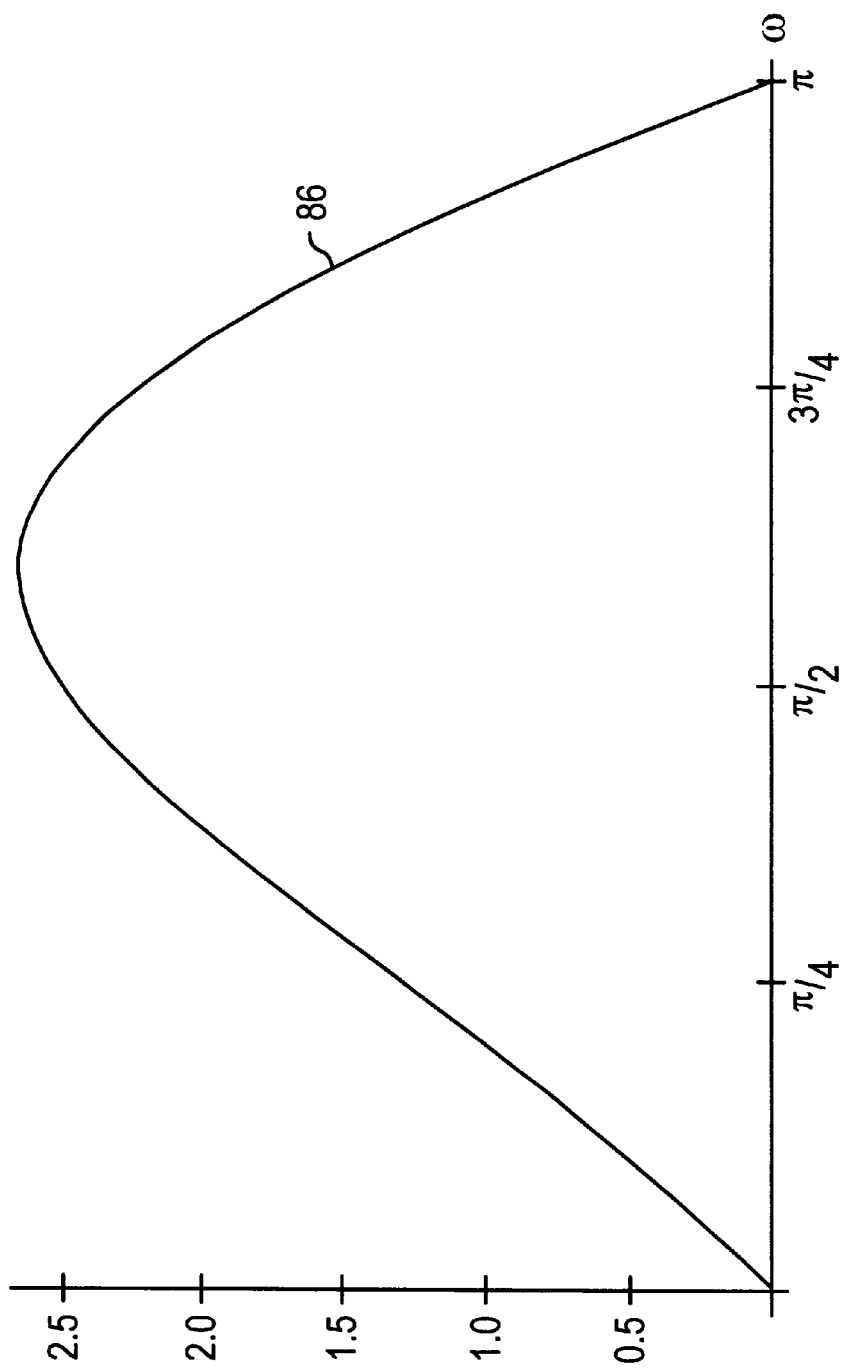
FIG. 5 is an illustration of an anti-symmetric edge filter response curve for up-sampling according to the present invention.

FIG. 5 illustrates an anti-symmetric frequency response curve of filt0 around sample $f_0$. Curve 86 shows the sharp edge response of the asymmetric sine component of the frequency response.

Figure 6:
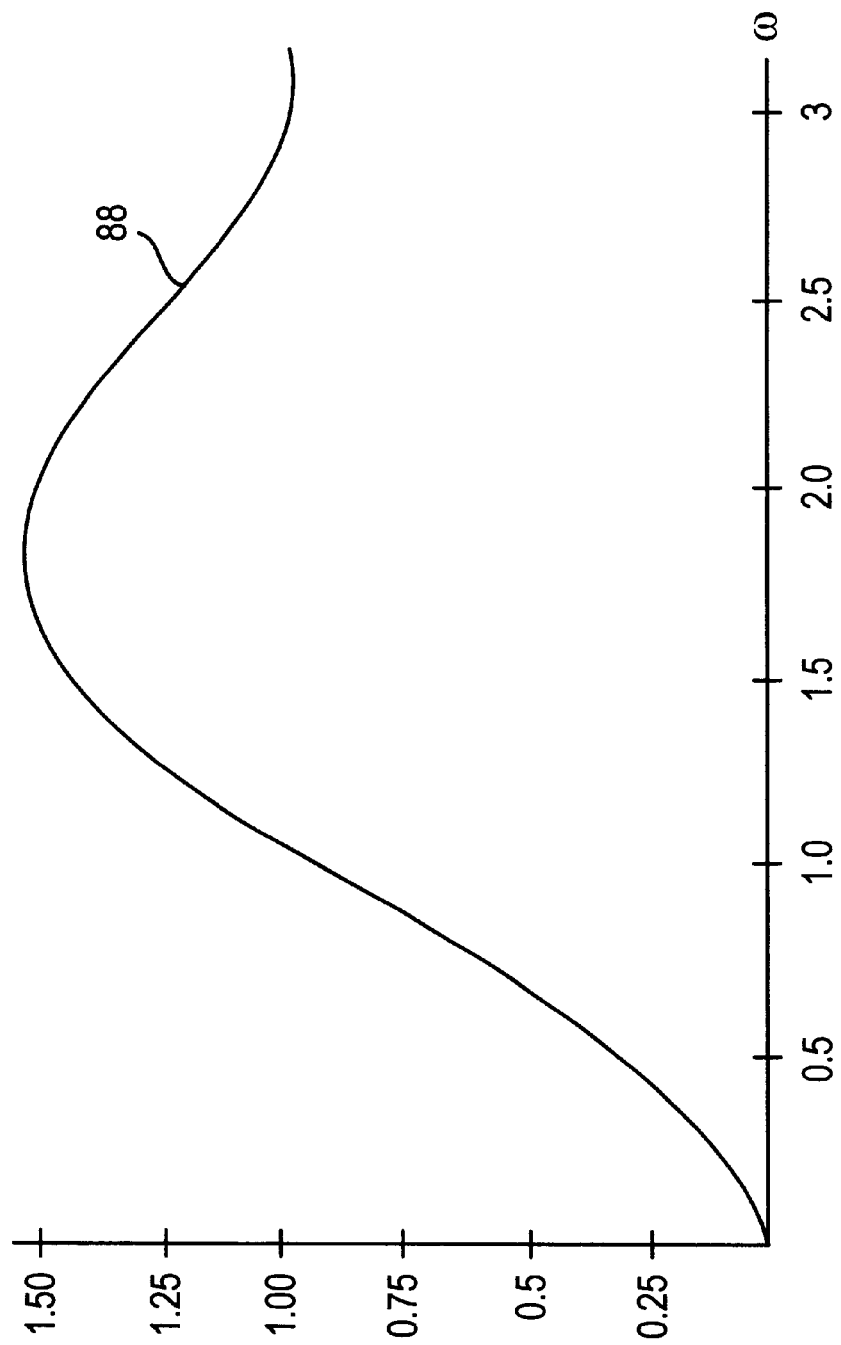
FIG. 6 is an illustration of a non-zero symmetric peak response curve for up-sampling according to the present invention.

FIG. 6 illustrates a symmetric frequency response curve of filt0 around sample $f_0$. Curve 88 shows the non-ideal peak response of the symmetric cosine component of the frequency response.

Once the outputs of the filters at step 68 have been determined, process 50 moves to step 70 where the ratio calculated at step 54, equation (2), is examined. If the ratio is between −1 and +3, the outputs of filters filt0 and filt1 are unemphasized at step 74. Because up-sampling typically sharpens an image, the filter outputs from step 68, equation (5), are each attenuated by ⅝ to obtain an accurate unemphasized differentiating response for the single sine wave case. Unemphasizing an image does not change the sharpness of the image. The new unemphasized gradients are:

$$gr0=(5/8)filt0$$

$$gr1=(5/8)filt1 \quad (6)$$

The frequency response of the unemphasized filter outputs provides a near ideal differentiating response. However, if the ratio is less than −1, the four sample points do not represent a single sine wave, but a multi-sine wave. Because a multi-sine wave may cause ringing artifacts due to multiple adjacent edges, an image is preferably emphasized (i.e., sharpened) to make the desired transition more prominent. An emphasized image is unattenuated. At step 72, the filter outputs from step 68, equation (5), become the emphasized gradients as follows:

$$gr0=filt0$$

$$gr1=filt1 \quad (7)$$

Emphasizing and unemphasizing filter outputs filt0 and filt1 preferably result in images that appear very much like the original image. Process 50 ends at step 76.

Figure 7:
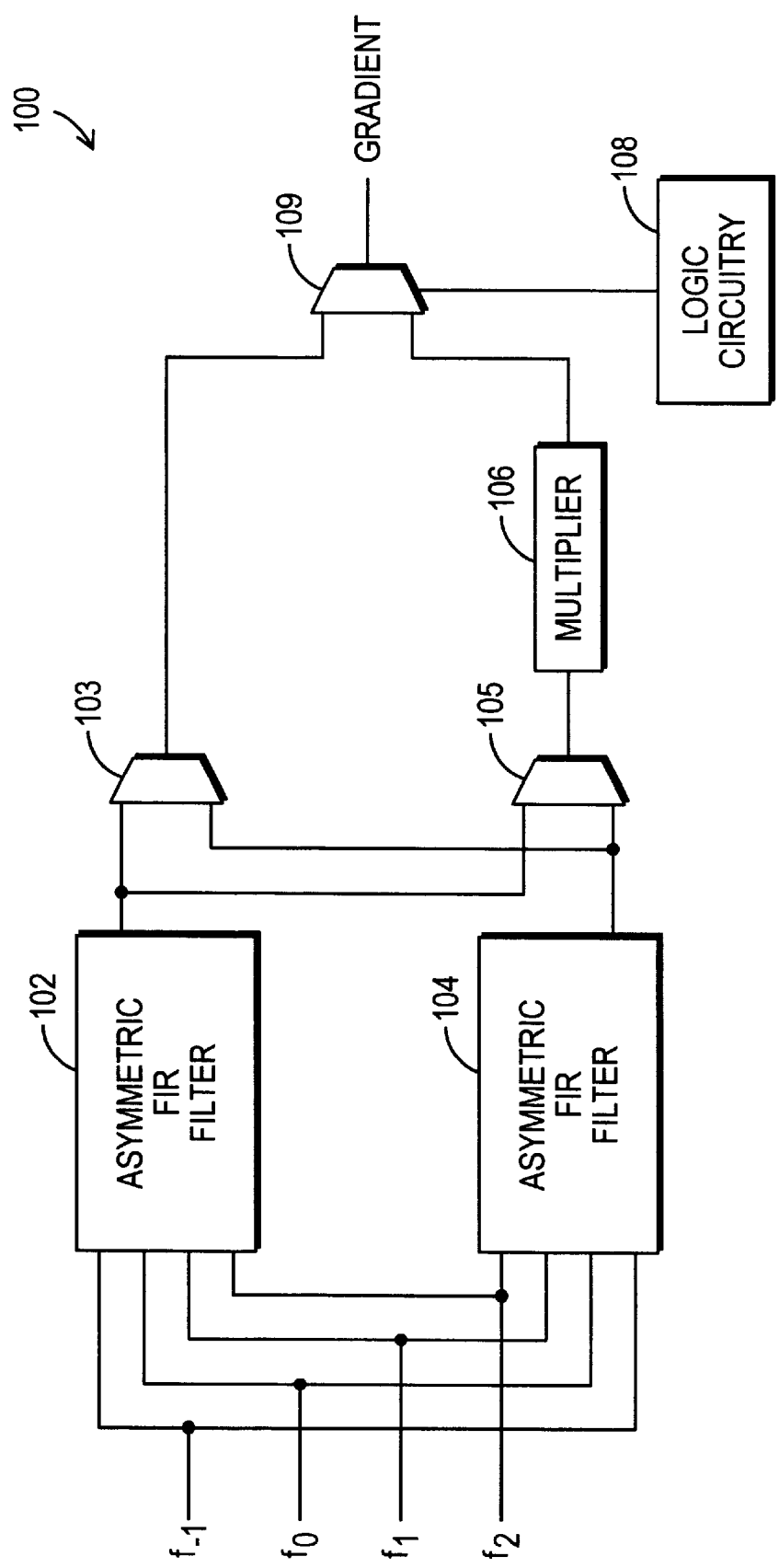
FIG. 7 is an illustration of an exemplary embodiment of an apparatus for estimating gradients when enlarging an image according to the present invention.

FIG. 7 illustrates an exemplary embodiment of apparatus 100 that estimates gradients when enlarging an image in accordance with the present invention. Apparatus 100 includes two digital 4-tap asymmetric FIR filters 102 and 104 operating in parallel. Each FIR filter 102 and 104 receives four image samples ($f_{-1}$, $f_0$, $f_1$, $f_2$) and filters those samples producing a filtered output in accordance with a respective equation (5). Apparatus 100 also preferably includes multiplexers 103 and 105, multiplier 106, and logic circuitry 108. Multiplexers 103 and 105 successively allow the outputs of asymmetric FIR filters 102 and 104 to pass through. Multiplier 106 attenuates (e.g., by ⅝) the outputs of FIR filters 102 and 104 (e.g., by multiplying or equivalently shifting and adding, etc.). The outputs of multiplier 106 (which represent unemphasized filter outputs) and multiplexer 103 (which represent emphasized filter outputs) are inputs to multiplexer 109, which is controlled by logic circuitry 106. Logic circuitry 106 selects either the unemphasized or emphasized filter outputs based on the ratio calculation and test at steps 54 and 70, respectively, shown in FIG. 3.

The use of short asymmetric FIR filters in up-sampling results in better image resizing than the more conventional anti-symmetric differentiating filters. The asymmetric filters provide good edge and extended-frequency responses with narrow peak sharpening characteristics. By emphasizing accurate edge handling where gradients are steepest and by sacrificing some spectral performance on peaks where gradients are shallowest, improved zone-plate test signal results are obtained. Resized images are of high quality when viewed by the human eye.

Turning back to FIG. 1, upon calculation of gradients, algorithm 10 moves to step 20 and step 22 to calculate the cubic model coefficients and the re-sampled output values, respectively. To re-sample images once the sample data and co-sited gradients are found, piece-wise continuous models of the signal are generated independently along each axis. The piece-wise cubic model may be obtained as follows:

$$f(\Delta p) = \sum_{i=0}^{3} C_i (\Delta p)^i \quad (8)$$

where $0 \leq \Delta p \leq 1$. The coefficients $C_i$ may be found as follows:

$k=f1-f0$ $C_3=gr1+gr0-2k$ $C_2=k-C_3-gr0$ $C_1=gr0$ $C_0=f0 \quad (9)$ where f0 and f1 are the original two middle input samples surrounding the output sample, and gr0 and gr1 are their corresponding co-sited gradients.

Lastly, at step 24, gamma restoration undoes the gamma modification of step 14, restoring the original gamma. The resulting image is suitable for display on a monitor. Algorithm 10 ends at step 26.

Testing of up-sampled images using resizer algorithm 10 have shown re-sampled images to be as sharp as or sharper than those obtained from advanced commercial software packages that have the option of using more sample support. While performance on zone-plate test signals near the Nyquist limit may be weak compared to other image resizing software, this has little bearing on visual quality in general.

Thus it is seen that the short asymmetric FIR filters improve image resizing results. One skilled in the art will appreciate that the present invention can be practiced by other than the described embodiments, which are presented for purposes of illustration and not of limitation, and the present invention is limited only by the claims which follow.

I claim:

1. A method of estimating gradients used to create re-sampling models for enlarging an image, said method comprising:

calculating a ratio comprising a difference of an outer two of four image samples divided by a difference of a middle two of said four image samples; and filtering said four image samples to obtain an asymmetric finite impulse response filtered output.

2. The method of claim 1 further comprising attenuating said filtered output when said ratio is within a predetermined range.

3. The method of claim 1 further comprising attenuating said filtered output by about ⅝ when said ratio ranges from about −1 to about 3.

4. The method of claim 1 wherein said filtering said four image samples comprises applying two 4-tap asymmetric finite impulse response filters in parallel to said four image samples.

5. The method of claim 4 wherein said applying two 4-tap asymmetric finite impulse response filters comprises:

multiplying a first of said four image samples by about −3/2;

multiplying a second of said four image samples by about 1;

multiplying a third of said four image samples by about 1;

multiplying a fourth of said four image samples by about −½; and adding products of all four said multiplyings to obtain a filtered output.

6. The method of claim 4 wherein said applying two 4-tap asymmetric finite impulse response filters comprises:

multiplying a first of said four image samples by about ½;

multiplying a second of said four image samples by about −1;

multiplying a third of said four image samples by about −1;

multiplying a fourth of said four image samples by about 3/2; and adding products of all four said multiplyings to obtain a filtered output.

7. A method of estimating gradients used to create re-sampling models for enlarging an image, said method comprising:

calculating a ratio comprising a difference of an outer two of four image samples divided by a difference of a middle two of said four image samples;

filtering said four image samples to obtain an asymmetric finite impulse response filtered output; and attenuating said filtered output to obtain an estimated gradient when said ratio lies within a predetermined range.

8. A method of estimating gradients used to create re-sampling models for enlarging an image, said method comprising:

calculating a ratio based on tour image samples;

applying an asymmetric finite impulse response filter to said four image samples to obtain a filtered output; and attenuating said filtered output by about ⅝ to obtain an estimated gradient when said ratio is within a range of about −1 to about 3.

9. A method of estimating gradients used to create re-sampling models for enlarging an image, said method comprising:

comparing a difference of an outer two of four image samples divided by a difference of a middle two of said four image samples to a predetermined range; and applying a 4-tap asymmetric finite impulse response filter to said four image samples, wherein said applying comprises:

multiplying a first of said four image samples by about −3/2;

multiplying a second of said four image samples by about 1;

multiplying a third of said four image samples by about 1;

multiplying a fourth of said four image samples by about −½; and adding products of all four said multiplyings to obtain a filtered output.

10. A method of estimating gradients used to create re-sampling models for enlarging an image, said method comprising:

comparing a difference of an outer two of four image samples divided by a difference of a middle two of said four image samples to a predetermined range; and applying a 4-tap asymmetric finite impulse response filter to said four image samples, wherein said applying comprises:

multiplying a first of said four image samples by about ½;

multiplying a second of said four image samples by about −1;

multiplying a third of said four image samples by about −1;

multiplying a fourth of said four image samples by about 3/2; and adding products of all four said multiplyings to obtain a filtered output.

11. A method of enlarging an image, said method comprising:

filtering middle two of four image samples;

estimating co-sited gradients of said four image samples using an asymmetric finite impulse response filter;

calculating cubic polynomial coefficients using said middle two of said four image samples and said co-sited gradients; and calculating re-sampled output sample values using said cubic polynomial coefficients.

12. The method of claim 11 wherein said enlarging occurs separably in each dimension of a two-dimensional plane.

13. The method of claim 11 wherein said filtering comprises applying a symmetric 3-tap finite impulse response filter to two samples of said four image samples, wherein:

a first tap has a coefficient of about 1/4;

a second tap has a coefficient of about 1/2; and a third tap has a coefficient of about 1/4.

14. The method of claim 11 wherein said filtering and said estimating are executed substantially in parallel.

15. The method of claim 11 wherein said estimating comprises calculating a ratio comprising a difference of an outer two of said four image samples divided by a difference of said middle two of four image samples.

16. The method of claim 15 wherein said estimating further comprises applying two asymmetric finite impulse response filters in parallel to said four image samples to obtain said co-sited gradients when said ratio is less than about 3.

17. The method of claim 16 wherein said applying comprises:

multiplying a first of said four image samples by about −3/2;

multiplying a second of said four image samples by about 1;

multiplying a third of said four image samples by about 1;

multiplying a fourth of said four image samples by about −1/2; and adding products of all four said multiplyings to obtain a filtered output.

18. The method of claim 16 wherein said applying comprises:

multiplying a first of said four image samples by about 1/2;

multiplying a second of said four image samples by about −1;

multiplying a third of said four image samples by about −1;

multiplying a fourth of said four image samples by about 3/2; and adding products of all four said multiplyings to obtain a filtered output.

19. The method of claim 16 wherein said estimating further comprises attenuating outputs of said two asymmetric finite impulse response filters by about 5/8 when said ratio ranges from about −1 to about 3.

20. The method of claim 11 wherein said estimating comprises:

estimating a first gradient corresponding to a first of said middle two of four image samples; and estimating a second gradient corresponding to a second of said middle two of four image samples.

21. The method of claim 11 wherein said calculating cubic polynomial coefficients and said calculating re-sampled output sample values comprise building a piece-wise continuous model of said output sample values using said middle two of four image samples and two co-sited gradients.

22. A method of estimating gradients used to enlarge an image, said method comprising:

calculating a ratio comprising a difference of an outer two of four image samples divided by a difference of a middle two of said four image samples;

filtering said four image samples as follows to obtain a first filtered output:

$$-(3/2)f_{-1}+f_0+f_1-(1/2)f_2;$$

filtering said four image samples as follows to obtain a second filtered output:

$$(1/2)f_{-1}-f_0-f_1+(3/2)f_2; \text{ and}$$

attenuating said first and second filtered outputs by 5/8 when said ratio is greater than or equal to −1 and less than or equal to 3;

wherein said $f_{-1}$, $f_0$, $f_1$, and $f_2$ respectively represent said four image samples.

23. Apparatus that estimates gradients used to enlarge an image, said apparatus comprising:

first and second 4-tap asymmetric finite impulse response filters;

a multiplier coupled to receive outputs of said first and second 4-tap asymmetric finite impulse response filters; and logic circuitry that determines whether outputs of said multiplier or said outputs of said first and second 4-tap asymmetric finite impulse response filters provide said estimated gradients.

24. The apparatus of claim 23 wherein said first 4-tap asymmetric finite impulse response filter comprises:

a first tap coefficient of about −3/2;

a second tap coefficient of about 1;

a third tap coefficient of about 1; and a fourth tap coefficient of about −1/2.

25. The apparatus of claim 23 wherein said second 4-tap asymmetric finite impulse response filter comprises:

a first tap coefficient of about 1/2;

a second tap coefficient of about −1;

a third tap coefficient of about −1; and a fourth tap coefficient of about 3/2.

26. The apparatus of claim 23 wherein said logic circuitry compares a threshold range with a ratio of four image samples comprising a difference of an outer two of said samples with a difference of a middle two of said samples.

27. The apparatus of claim 23 wherein said multiplier attenuates input signals by about 5/8.

28. Apparatus for estimating gradients used to create re-sampling models for enlarging an image, said apparatus comprising:

means for calculating a ratio comprising a difference of an outer two of four image samples divided by a difference of a middle two of said four image samples; and means for filtering said four image samples to obtain an asymmetric finite impulse response filtered output.

29. Apparatus for estimating gradients used to create re-sampling models for enlarging an image, said apparatus comprising:
- means for calculating a ratio comprising a difference of an outer two of four image samples divided by a difference of a middle two of said four image samples;
- means for filtering said four image samples to obtain an asymmetric finite impulse response filtered output; and
- means for attenuating said filtered output to obtain an estimated gradient when said ratio lies within a predetermined range.

30. Apparatus for enlarging an image, said apparatus comprising:
- means for filtering middle two of four image samples;
- means for estimating co-sited gradients of said four image samples using an asymmetric finite impulse response filter;
- means for calculating cubic polynomial coefficients using said middle two of four image samples and said co-sited gradients; and
- means for calculating re-sampled output sample values using said cubic polynomial coefficients.

31. Apparatus for estimating gradients used to enlarge an image, said apparatus comprising:
- means for calculating a ratio comprising a difference of an outer two of four image samples divided by a difference of a middle two of said four image samples;
- means for filtering said four image samples as follows to obtain a first filtered output:

$$-(3/2) f_{-1}+f_0+f_1+(1/2)f_2;$$

- means for filtering said four image samples as follows to obtain a second filtered output:

$$(1/2)f_{-1}-f_0-f_1+(3/2)f_2; \text{ and}$$

- means for attenuating said first and second filtered outputs by 5/8 when said ratio is greater than or equal to −1 and less than or equal to 3;
- wherein said $f_{-1}$, $f_0$, $f_1$, and $f_2$ respectively represent said four image samples.

32. Apparatus for estimating gradients used to enlarge an image, said apparatus comprising:
- first and second 4-tap asymmetric finite impulse response filter means;
- a multiplier means coupled to receive outputs of said first and second 4-tap asymmetric finite impulse response filters;
- logic circuitry means that determines whether outputs of said multiplier or said outputs of said first and second 4-tap asymmetric finite impulse response filters provide said estimated gradients.

* * * * *

UNITED STATES PATENT AND TRADEMARK OFFICE
CERTIFICATE OF CORRECTION

PATENT NO. : 6,795,587 B2
DATED : September 21, 2004
INVENTOR(S) : Keith R. Slavin It is certified that error appears in the above-identified patent and that said Letters Patent is hereby corrected as shown below:

Column 3,
Line 41, change "$Y'=(y)^{1/\gamma}$" to -- $Y'=(Y)^{1/\gamma}$ --.

Column 6,
Line 52, change "A" to -- $\omega$ --.

Column 10,
Line 30, change "tour" to -- four --.

Column 14,
Line 4, change "- $(3/2) f_{-1} + f_0 + f_1 + (1/2) f_2$" to -- - $(3/2) f_{-1} + f_0 + f_1 - (1/2) f_2$ --.

Signed and Sealed this

Twenty-first Day of June, 2005

JON W. DUDAS
*Director of the United States Patent and Trademark Office*